US010889236B2

(12) United States Patent
Gröne

(10) Patent No.: US 10,889,236 B2
(45) Date of Patent: Jan. 12, 2021

(54) WORKING SPOTLIGHT AND VEHICLE WITH A WORKING SPOTLIGHT

(71) Applicant: Hella GmbH & Co. KGaA, Lippstadt (DE)

(72) Inventor: Stefan Gröne, Brakel (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/526,130

(22) Filed: Jul. 30, 2019

(65) Prior Publication Data

US 2020/0039421 A1 Feb. 6, 2020

(30) Foreign Application Priority Data

Jul. 31, 2018 (DE) .......................... 10 2018 118 439

(51) Int. Cl.
*B60Q 1/24* (2006.01)
*B60Q 1/50* (2006.01)
(52) U.S. Cl.
CPC .................. *B60Q 1/24* (2013.01); *B60Q 1/50* (2013.01); *B60Q 2400/50* (2013.01)
(58) Field of Classification Search
CPC ......... B60Q 1/24; B60Q 1/50; B60Q 2400/50
See application file for complete search history.

(56) References Cited

U.S. PATENT DOCUMENTS

| 10,434,933 | B2 * | 10/2019 | Kunii ...................... B60Q 1/50 |
| 2016/0034771 | A1 * | 2/2016 | Schamp ............. G01B 11/2545 |
| | | | 348/148 |
| 2017/0101147 | A1 * | 4/2017 | Hasegawa ................ B60Q 1/44 |
| 2018/0009374 | A1 * | 1/2018 | Kim ...................... B60Q 1/2607 |
| 2018/0029641 | A1 * | 2/2018 | Solar ..................... G01S 13/931 |
| 2018/0237156 | A1 * | 8/2018 | Ross ....................... B64D 45/00 |

FOREIGN PATENT DOCUMENTS

| DE | 10240227 A1 | 3/2004 |
| DE | 102006002960 A1 | 7/2007 |
| DE | 102011119923 A1 | 5/2013 |
| DE | 202016004062 U1 | 9/2016 |

\* cited by examiner

*Primary Examiner* — Anabel Ton
(74) *Attorney, Agent, or Firm* — Husch Blackwell LLP

(57) ABSTRACT

A working spotlight for a vehicle is provided, featuring a housing, a light source, and a light guide system for guiding working light generated by the light source in a predefined direction out of the housing and into a working area. In and/or on the housing, a means of generating a motif is arranged for projecting at least one motif onto a projection surface outside of the housing.

9 Claims, 2 Drawing Sheets

WORKING SPOTLIGHT AND VEHICLE WITH A WORKING SPOTLIGHT

CROSS REFERENCE

This application claims priority to German Application No. 10 2018 118439.5, filed 31 Jul. 2018, the entirety which is hereby incorporated by reference.

FIELD OF THE INVENTION

The present invention pertains to a working spotlight and a vehicle with a working spotlight.

BACKGROUND OF THE INVENTION

Various systems for illuminating working areas are known in the current state of technology. For example, working spotlights in various designs and embodiments are in use in various areas, not only on construction, forestry and/or agricultural machines but also on emergency vehicles of the emergency services, such as the fire department and technical relief services.

Working spotlights of the given design can be used on vehicles to illuminate a working area when the vehicle is stationary or when it is moving slowly off public roadways. In this context, various illumination scenarios may be necessary in different working situations. Specifically, it may be necessary to warn workers in the working area or in the vicinity of the working area of hazards in the working area. In this context, known methods of securing a hazard area is to use warning tape and/or additional light sources. However, this requires more material and equipment, consequently involving additional cost, which is to be avoided. Furthermore, in some terrain situations is it difficult or even impossible to position the desired safeguards or corresponding notices.

Furthermore, it is a known method to point out to workers hazards in the working area by means of various light signals by the working spotlight. For example, a warning lamp can be arranged on the working spotlight that illuminates at least a part of the working area in red to point out a potential hazard in this area. Different color codes are, however, not always understood to be a clear warning message.

SUMMARY OF THE INVENTION

The purpose of the present invention is to take at least partially into account the aforementioned problems relating to securing working areas. In particular, one purpose of the present invention is to create an improved working spotlight and a vehicle with a working spotlight to improve work safety.

Of course, the described features that refer to the working spotlight also apply to the vehicle, and vice versa such that any disclosed information regarding individual aspects of the invention may be understood as referring to either the working spotlight or the vehicle.

According to one first aspect of the present invention, a working spotlight for a vehicle is made available. The working spotlight features a housing, a light source and a light guide system for guiding working light generated by the light source in a predefined direction out of the housing into a working area. In accordance with the invention, a means of generating a motif is arranged in or on the housing for projecting at least one motif onto a projection surface outside of the housing.

The means of generating a motif makes it possible to point out clearly and in a simple and cost-effective manner to workers any potential hazards in the working area. In this way, the means of generating a motif can be used to depict motifs, such as an exclamation point with or without a red border, a lightning flash or other pictographs that can be quickly clearly identified by every worker as a warning notice.

Motif can also be understood to be an image with lettering or only lettering. This means that the means of generating a motif can also be used to write or correspondingly project specific warning notices into the working area or onto the projection surface in the working area.

The light source can be understood to be a lighting unit with at least one lighting element. The light guide system preferentially features a reflector that bundles the light generated by the light source and directs it out of the housing in the desired direction.

The ability of the means of generating a motif to project the at least one motif onto the projection surface outside of the housing can be understood to mean that using the means of generating a motif makes it possible to project the at least one motif onto the projection surface outside of the housing. This means that the means of generating a motif and further system components such as the light source and the light guide system can be used for projecting the at least one motif onto the projection surface.

An aperture with a motif can be arranged in or on the housing, by means of which aperture the desired motif can be projected onto the projection surface. In addition or as an alternative, a transparency unit can be arranged for positioning a transparency in the light path of the light that is generated by the light source. By means of the aperture with a motif and/or the transparency unit, the light of the light source or the working light can be used that is also employed to illuminate the working area. Consequently, the light source can be used to illuminate the working area and to generate the at least one motif. The working spotlight can therefore be made available in an especially space-saving way and operated in an energy-efficient manner.

Projection surface can be understood to mean an area on ground or in a terrain on which or in which the vehicle or a worker with the working spotlight is located. The working spotlight can be mounted to a vehicle or carried in a worker's hand. This means that the working spotlight can be understood to mean a mobile or portable working spotlight. For this purpose, the working spotlight may feature a dedicated handle section for to enable a person to hold and/or carry the working spotlight. The light source of the working spotlight features a maximum luminous flux with a luminous intensity of at least 1,000 lumens, specifically with a luminous intensity of between 1,000 lumens and 10,000 lumens.

The means of generating a motif can feature a transparency unit for projecting the at least one motif in the form of a transparency image onto the projection surface. This constitutes a technically relatively simple and cost-effective solution. The means of generating a motif can also feature a laser unit for projecting the at least one motif in the form of a laser image onto the projection surface. The laser unit makes it possible to project various motifs even in poor lighting conditions so they can be clearly identified on the projection surface.

The at least one motif is depicted in the form of an area on the projection surface that is illuminated to a limited extent and differs specifically from simple geometric figures, such as a disk or a rectangle. The at least one motif can be understood to be writing and/or a symbol that can be depicted in color or in black and white.

An arrangement of the means of generating a motif in or on the housing should be understood to be a positioning of the means of generating a motif within the housing, on the outside of the housing or both within the housing and on the outside of the housing.

According to a further embodiment of the present invention, it is possible for the means of generating a motif to feature a switching unit to switch between different motifs that can each be projected on the projection surface outside of the housing. This can be used to project suitable motifs into the working area or onto the projection surface depending on the working situation in question. The fact that a warning notice specific to each hazardous situation can be projected into the working area can counteract habituation towards general notices such as a red light and make workers aware of the hazardous situation prevailing at the given time. This makes it possible to correspondingly increase work safety. When a transparency unit as described above is used, the switching unit can feature a transparency exchanger, a transparency revolving system or transparency rotator.

Furthermore, it is possible for the working spotlight according to the present invention to feature a zoom unit for optical zooming of the motif onto the projection surface. The zoom unit makes it possible for the at least one motif to be adjusted to the size of the respective working area. This also makes it possible to increase safety in the working area in an especially simple way. The zoom unit is preferentially made available in combination with a means of adjusting the focus. The means of adjusting the focus can be used to depict the at least one motif in focus at different zoom levels, such that the workers can recognize any warning notices clearly and unambiguously.

In addition, it may be advantageous if a working spotlight in accordance with the invention is equipped with a floodlight unit to illuminate an area on the projection surface around the at least one motif. By means of the floodlight unit, the at least one motif can be depicted more visibly to workers or emphasized on the projection surface or the projection ground in the working area, which enables the work safety to be correspondingly improved.

In the case of a further arrangement version of the present invention, it is possible for the light source to feature at least one LED. To date, working spotlights were designed primarily in the form of halogen spotlights. LEDs are characterized in particular by long-term durability and energy-efficient operation. The at least one light source preferentially features several LEDs.

In the case of a working spotlight in accordance with the invention, it is additionally possible for a signal reception unit for receiving a setting signal for setting the motive to be arranged in or on the housing. If the signal reception unit is coupled with a signal transmitter on the vehicle or a smart device, for example, the desired motif can be set by pressing a button in the vehicle or on the smart device. The at least one motif can thus be set in an especially easy way. For example, a preview of every available motif can be depicted on the smart device. Smart device can be understood to be a smartphone, a smart watch or a tablet computer, where the present invention is not limited to the same. For example, the signal reception unit can also be connected with a signal transmitter or another mobile or stationary computer as described above.

It is especially advantageous if a working spotlight control unit for automatically setting the motif depending on the setting signal received is arranged in or on the housing of a working spotlight according to the present invention. In this way, the work step consisting of setting the desired motif can be dispensed with. In this way, the at least one motif can be automatically set depending on the surrounding conditions identified depending on which the setting signal is generated. For example, the at least one motif can be projected automatically into the working area by means of the working spotlight control unit as soon as it is identified that the working area is too dark or as soon as a corresponding setting signal is generated and transmitted to the working spotlight control unit. A computer program can be used to automatically set the desired motif. The computer program can be written as a computer-readable command code in every suitable programming language such as JAVA or C++. The computer program can be stored and/or installed on a computer-readable storage medium such as a data disk, a removable, a volatile or nonvolatile memory or a memory/processor built into the working spotlight. The command code can program a computer or other programmable devices such as the control unit in such a way that the desired functions are executed. Furthermore, the computer program can be made available in a network such as the Internet or from which it can be downloaded by a user as required. The computer program can be implemented either by means of software or by means of one or more special electronic circuits, i.e. in hardware in the form of a computer program product or in any hybrid form, i.e. by means of software components and hardware components.

In addition, a mounting section for mounting the working spotlight can be arranged on the housing of a working spotlight in accordance with the invention for mounting the working spotlight. A dedicated mounting section makes it possible for the working spotlight to be easily attached to the vehicle or another fixture.

Furthermore, it is possible for the means of generating a motif of a working spotlight according to the present invention to be designed for projecting the at least one motif along with the working light onto a projection surface outside of the housing and within the working area. This means that the same light source is used for projecting the at least one motif onto the projection surface and for the working light. The working light is used, as it were, for setting the at least one motif. As this means that no separate light source is needed for setting the at least one motif, the working spotlight can be operated in an energy-efficient manner and made available in a compact form. A transparency or a corresponding masking aperture can be positioned in the light path of the light source from the light source in the direction of the working area for projecting the at least one motif along with the working light outside of the housing and within the working area.

According to a further aspect of the present invention, a vehicle is made available with a working spotlight as described above. As a result, the vehicle in accordance with the invention brings about the same advantages as described in detail in relation to the working spotlight in accordance with the invention. The vehicle is preferentially designed in the form of a motor vehicle, especially in the form of a utility vehicle.

Further measures refining the invention arise from the description below of various sample embodiments of the invention, which are depicted schematically in the Figures. All of the features and/or advantages arising from the Claims, description or the figures, including design details and physical layouts, may be vital to the invention both by themselves and in various combinations.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Elements with the same function and modes of action are each given the same reference numbers in FIGS. 1 through 4.

Figure 1:
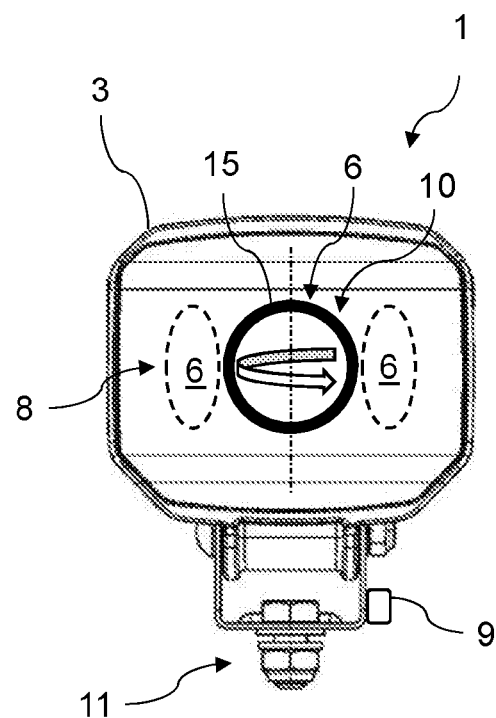
FIG. 1 is a front view of a working spotlight according to an embodiment of the present invention.

FIG. 1 shows a working spotlight 1 for a vehicle 2 with a housing 3, a light source 4 with several LEDs and a light guide system 5 (cf. FIG. 2) for guiding working light generated by the light source 4 in a predefined direction out of the housing 3 into a working area. Within the housing 3, a means of generating a motif 6 is arranged for projecting a motif 7 (cf. FIG. 3) onto a projection surface outside of the housing 3.

The means of generating a motif 6 features a switching unit 8 for switching between different motifs 7 that can each be projected on the projection surface outside of the housing 3. The switching unit 8 depicted is designed in the form of a revolving system, by means of which different transparencies can be positioned in the light path of the working spotlight 1. The working spotlight 1 further features a zoom unit 15 to achieve optical zooming of the motif 7 onto the projection surface. The zoom factor of the zoom unit 15 can be adjusted by turning a zoom ring on the zoom unit 15, where different optical elements of the zoom unit 15 are moved in relation to each other.

According to the embodiment depicted in FIG. 1, a floodlight unit 10 for illuminating an area on the projection surface around the motif 7 is arranged in the housing 3. In the present example, the floodlight unit 10 comprises the light source 4. This means that the light source 4 generates the working light with which the motif 7 can be illuminated. Consequently, the means of generating a motif 6 for projecting the motif 7 onto a projection surface together with the working light is arranged outside of the housing 3 and within the working area.

As depicted in FIG. 1, a signal reception unit 9 is arranged in or on the housing 3 for receiving a setting signal for setting the motif 7. In the present case, the signal reception unit is designed for receiving radio signals from an external computer, for example in the form of or as a component of a smartphone, such that the working spotlight 1 can be controlled by the smartphone. For this purpose, a working spotlight control unit 12 for automatically setting the motif 7 depending on the setting signal received is arranged on the housing 3. This means that when, for example, a motif with a warning triangle enclosing an exclamation point is selected, the same is automatically generated by means of the working spotlight control unit 12 and correspondingly projected into the working area.

The working spotlight depicted in FIG. 1 features a mounting section 11 on the housing intended for mounting the working spotlight 1 on the vehicle 2 or bolting it to the vehicle 2.

Figure 2:
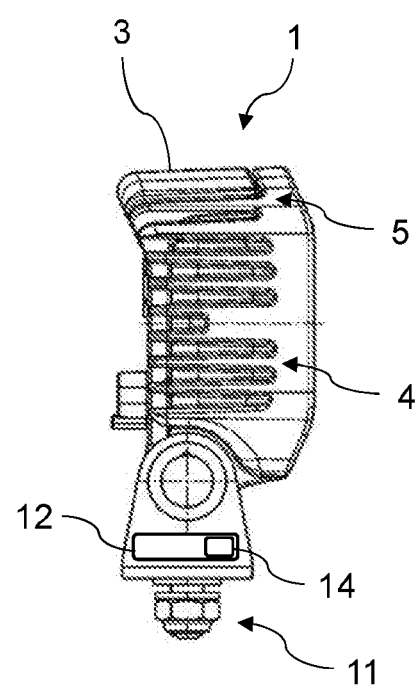
FIG. 2 is a side view of the working spotlight depicted in FIG. 1.

FIG. 2 shows a side view of the working spotlight 1 depicted in FIG. 1 in which the light guide system 5 in particular is depicted in the form of a reflector in the housing 3. Furthermore, FIG. 2 depicts the working spotlight control unit 12 in which a computer program 14 is installed for executing the functions of the working spotlight control unit 12.

Figure 3:
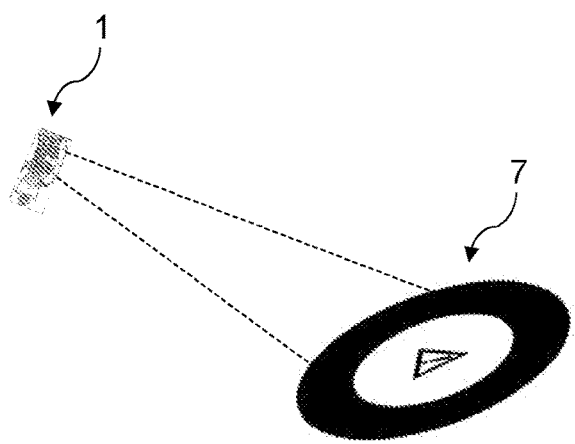
FIG. 3 is a working spotlight that is depicting a motif according to an embodiment of the present invention.

FIG. 3 shows the working spotlight 1 depicted in FIG. 1 and FIG. 2 in an operating mode in which a motif 7 involving a warning triangle surrounding an exclamation point is projected onto a projection surface in an working area, where an area on the projection surface around the motif 7 is illuminated by means of the floodlight unit 10.

Figure 4:
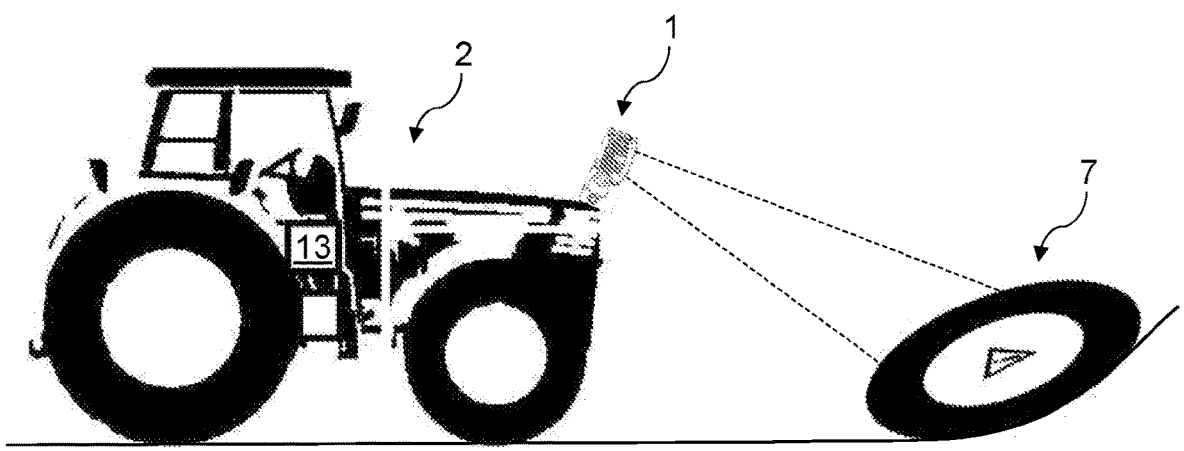
FIG. 4 is a vehicle with a working spotlight according to an embodiment of the present invention.

FIG. 4 depicts a vehicle 2 in the form of a tractor with a working spotlight 1 mounted on its engine cover that projects a motif 7 or a logo onto the ground in a working area. The vehicle 2 features a vehicle control unit 13 by means of which the working spotlight 1 can be controlled. The vehicle control unit 13 can be linked by signal connection to control elements in a vehicle cab of vehicle 2 such that a worker can control the working spotlight 1 by actuating the control elements. The signal connection between vehicle 2 and working spotlight 1 may be wireless or wired.

In addition to the embodiments depicted, the invention permits further design principles. This means that the invention should not be seen as being limited to the sample embodiment explained with reference to the figures. For example, a means of adjusting the focus can be arranged in or on the working spotlight 1 for focusing a zoomed motif 7 in addition to the zoom unit 15. In contrast to the embodiment depicted, the floodlight unit 10 and the light source 4 can be arranged separately from each other such that a further light source can be provided for illumination purposes alongside the light source 4 for the working light. Furthermore, the working spotlight 1 can feature a separate handle section by means of which it can be held and/or carried by one person.

LIST OF REFERENCE NUMBERS

1 Working spotlight
2 Vehicle
3 Housing
4 Lighting products
5 Light guide system
6 Means of generating a motif
7 Motif
8 Switching unit
9 Signal reception unit
10 Floodlight unit
11 Mounting section
12 Working spotlight control unit
13 Vehicle control unit
14 Computer program
15 Zoom unit

I claim:
1. A working spotlight for a vehicle, the spotlight comprising:
   a housing;
   a light source; and
   a light guide system for guiding working light generated by the light source in a predefined direction out of the housing and into a working area, wherein a means of generating a motif is arranged at least one of in and on the housing for projecting at least one motif on a projection surface outside of the housing; and wherein the means of generating the motif features a switching unit for switching between different motifs for projection onto the projection surface outside of the housing.

2. A working spotlight for a vehicle, the spotlight comprising:
   a housing;
   a light source; and
   a light guide system for guiding working light generated by the light source in a predefined direction out of the housing and into a working area,
wherein a means of generating a motif is arranged at least one of in and on the housing for projecting at least one motif on a projection surface outside of the housing; and wherein the working spotlight features a zoom unit to achieve optical zooming of the motif onto the projection surface.

3. A working spotlight for a vehicle, the spotlight comprising:
   a housing;
   a light source; and
   a light guide system for guiding working light generated by the light source in a predefined direction out of the housing and into a working area,
wherein a means of generating a motif is arranged at least one of in and on the housing for projecting at least one motif on a projection surface outside of the housing; and wherein a floodlight unit is arranged at least one of in and on the housing for floodlighting an area on the projection surface around the at least one motif.

4. The working spotlight in accordance with claim 1, wherein the light source features at least one LED.

5. A working spotlight for a vehicle, the spotlight comprising:
   a housing;
   a light source; and
   a light guide system for guiding working light generated by the light source in a predefined direction out of the housing and into a working area,
wherein a means of generating a motif is arranged at least one of in and on the housing for projecting at least one motif on a projection surface outside of the housing; and wherein a signal reception unit is arranged in or on the housing for receiving a setting signal for setting the motif.

6. The working spotlight in accordance with claim 5, wherein a working spotlight control unit is arranged in or on the housing for automatically setting the motif depending on the setting signal received.

7. The working spotlight in accordance with claim 1, wherein a mounting section is arranged on the housing for mounting the working light on the vehicle.

8. The working spotlight in accordance with claim 1, wherein the means of generating a motif is arranged for projecting the at least one motif together with the working light onto a projection surface outside of the housing and within the working area.

9. A vehicle with a working spotlight in accordance with claim 1.

* * * * *